(12) United States Patent
Sun

(10) Patent No.: US 7,865,570 B2
(45) Date of Patent: Jan. 4, 2011

(54) MEMORY SERVER

(75) Inventor: Xian-He Sun, Darien, IL (US)

(73) Assignee: Illinois Institute of Technology, Chicago, IL (US)

( * ) Notice: Subject to any disclaimer, the term of this patent is extended or adjusted under 35 U.S.C. 154(b) by 1166 days.

(21) Appl. No.: 11/215,321

(22) Filed: Aug. 30, 2005

(65) Prior Publication Data

US 2007/0067382 A1 Mar. 22, 2007

(51) Int. Cl.
*G06F 15/16* (2006.01)
(52) U.S. Cl. .................. 709/217; 709/203; 709/231; 709/233; 709/226; 711/126; 382/305
(58) Field of Classification Search .................. 709/217, 709/203, 226, 231, 233; 711/126; 382/305
See application file for complete search history.

(56) References Cited

U.S. PATENT DOCUMENTS

| | | | | |
|---|---|---|---|---|
| 5,305,389 | A * | 4/1994 | Palmer | 382/305 |
| 5,659,777 | A | 8/1997 | Iwasaki et al. | |
| 5,829,041 | A | 10/1998 | Okamoto et al. | |
| 5,873,117 | A | 2/1999 | Hagersten et al. | |
| 5,898,883 | A | 4/1999 | Fujii et al. | |
| 5,923,847 | A | 7/1999 | Hagersten et al. | |
| 5,960,461 | A | 9/1999 | Frank et al. | |
| 6,092,157 | A | 7/2000 | Suzuki | |
| 6,108,694 | A | 8/2000 | Yashiro et al. | |
| 6,134,710 | A * | 10/2000 | Levine et al. | 717/158 |
| 6,247,041 | B1 | 6/2001 | Krueger et al. | |
| 6,327,608 | B1 * | 12/2001 | Dillingham | 709/203 |
| 6,604,136 | B1 | 8/2003 | Chang et al. | |
| 6,754,803 | B1 | 6/2004 | Kawaguchi | |
| 6,766,360 | B1 | 7/2004 | Conway et al. | |
| 6,826,660 | B2 | 11/2004 | Hagersten et al. | |
| 6,829,637 | B2 | 12/2004 | Kokku et al. | |
| 6,862,609 | B2 | 3/2005 | Merkey | |
| 6,871,219 | B2 | 3/2005 | Noordergraaf et al. | |
| 7,747,749 | B1 * | 6/2010 | Erikson et al. | 709/226 |
| 2004/0215746 | A1 * | 10/2004 | McCanne et al. | 709/219 |
| 2007/0124622 | A1 * | 5/2007 | Johns et al. | 713/501 |
| 2008/0229025 | A1 * | 9/2008 | Plamondon | 711/126 |
| 2008/0301316 | A1 * | 12/2008 | Alpern et al. | 709/231 |
| 2009/0287842 | A1 * | 11/2009 | Plamondon | 709/233 |
| 2010/0088369 | A1 * | 4/2010 | Sebastian et al. | 709/203 |

OTHER PUBLICATIONS

Using predictive prefetching to improve world wide web latency Venkata N. Padmanabhan; Jeffrey C. Mogul Computer Communication Review 1996.*
Lirs: An efficient low inter-reference recency set replacement policy to improve buffer cache performance Song Jiang; Xiaodong Zhang Marina Del Rey 2002.*
S. Byna et al., *Predicting Memory-Access Cost Based on Data-Access Patterns*, Proceedings of IEEE International Conference on Cluster Computing, San Diego, Sep. 2004.

* cited by examiner

*Primary Examiner*—Thu Ha Nguyen
(74) *Attorney, Agent, or Firm*—Pauley Petersen & Erickson

(57) ABSTRACT

A memory server provides data access as a service to clients and has a memory service architecture and components for removing data management burdens from the client processor and providing increased speed and utility for the client through aggressive prediction of client memory requirements and fast provision of data.

20 Claims, 1 Drawing Sheet

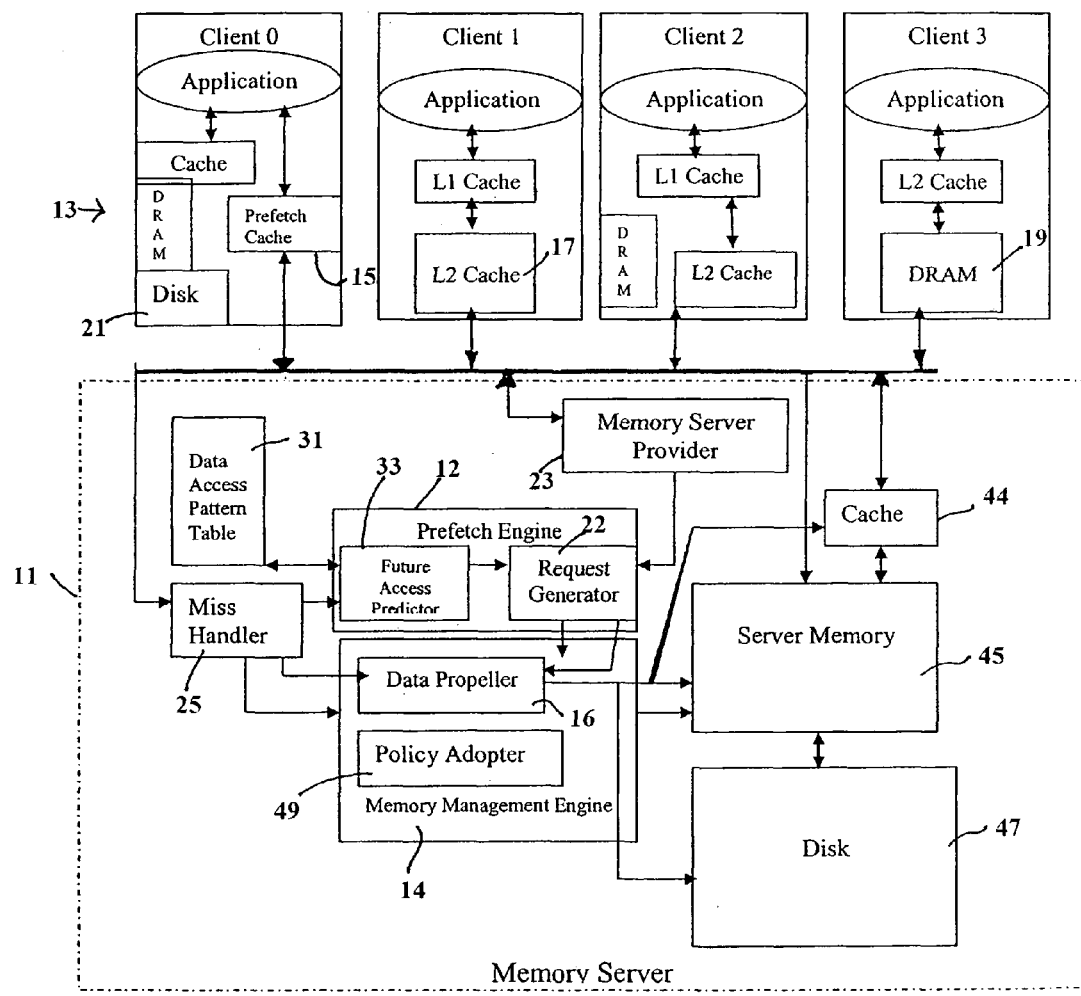
FIGURE

MEMORY SERVER

BACKGROUND OF THE INVENTION

1. Field of the Invention

The present invention provides improvements to the memory structure and utilization of computer systems. "Computer memory" as used herein holds data temporarily during information processing for fast data access. The term "memory" generally identifies data on ICs or memory chips. The word "storage" is generally used for data that exists non-dynamically on tapes or disks.

2. Discussion of the Related Art

Most modern computer memories are hierarchical and comprise multiple levels of caches of fast but more expensive memory and a slower main memory (DRAM). The computer will then use a storage disk for long term, secondary storage. Roughly speaking, disk access is 100 times slower than main memory access, and main memory access is 10 to 50 times slower than cache access with current technology.

Processor and network technologies are evolving rapidly. The growth in the number of transistors in each processor is rapidly increasing processor capabilities. Innovations in utilizing theoretically unlimited bandwidth of fiber optics can be helpful in reducing the network latency.

However, the incompatibilities among processor and memory performance are fueling an increasing performance gap between peak performance and sustained performance of computers. Moreover, power consumption increases faster than processor and memory performance. Increased power consumption has become a major obstacle for modern computing, from high-end supercomputers to small electronic devices.

In recent years, memory bandwidth has become a major bottleneck to full utilization of the capacity of processors and network capabilities. Following the so-called Moore's law, processor speed continues to double roughly every 18 months. Network interconnect speeds are also increasing to hundreds of Gbps and the latency is being reduced to a few nanoseconds. In contrast, main memory (DRAM) speed and its bandwidth have not increased enough to catch up with the processor speeds. This performance gap has been increasing for the last 20 years and is becoming a bottleneck for performance.

Advanced hierarchical memories that include cache memories at various levels have been developed to bridge this gap. A cache memory works on the principle of spatial and temporal locality. However, there are many applications that lack locality in accessing the memory. These applications spend a major fraction of execution time waiting for data accesses.

Power requirements of computing devices are also increasing with the computing power and functionality. The current improvement of chip performance depends on the rising number of transistors. On the positive side, this enables the increase in the cache size and more levels of cache and translation look-aside buffer. But this also rapidly increases the power demands caused by numerous chips in a computing device. The increasing power requirements can be understood by comparing the consumption of Intel PENTIUM 4 (75 watts) to Intel ITANIUM (130 watts) processors.

There are writings known in the art which use the term "memory server" in various contexts. All writings known to the applicant merely try to exploit improving data access time by substituting remote memory for local disk access without removing data management burdens from the main CPU. The focus of these so-called "servers" is to provide space for data, and not to fetch data to other processing elements.

SUMMARY OF THE INVENTION

What is needed in the art is a fundamental difference of approach whereby data access, sometimes referred to herein as computer memory, is provided as a service, instead of simply using some available remote memory as a substitute temporary disk storage. In some embodiments the memory server of the present invention can remove the data fetching and prefetching burdens from the main computational processor of an application and provide a memory and data access service adaptively based on application requirements.

The present invention introduces an architecture where a memory server provides computer memory as a service. The memory server can support client computer memory in order to save energy as well as bridge the current performance gap between processor and memory functions. The memory server includes a processing element which is dedicated to provide data to other processing elements, e.g., the processor running the computations of an application. The memory server can take advantage of the rapid advances of multi-core chip technology and network technology and could, for example, include one core of a multi-core chip, a processor in a shared memory parallel computer, a built-in server of a computer cluster, a remote network server, or the like. The present discussion will use the terms memory server and client, it being appreciated that the server and client may be arranged in a number of ways.

The architecture of the present invention can reduce the data access time of a computer system by inserting a new memory server that provides additional fast memory space and pushes the desired data into the higher levels of the client memory hierarchy before and/or when it is needed. For instance, in a multi-core system or a shared memory system, a core or a processor can be used as the memory server to push data into a client prefetch cache. In a distributed or networked system, a node or a computer can be used as the memory server to push data into other client nodes' or client computers' memories or caches. The benefits of doing so are evident when one considers that a dedicated server will provide better data prediction and prefetching.

Also, having two less powerful processing elements, one for computing and one for memory service, is typically more cost effective than having one more powerful processing element, in the aspects of manufacturing cost, power consumption, and operation efficiency. Operational efficiency is a driving factor of the recent popularity of multicore chips and the continued development of parallel processing. In addition to making decisions and managing data movement, the memory server can use its memory as an extended memory or provide storage for the client application. Most applications only occasionally need large memory or other memory services. Therefore, the memory server can serve multiple client processors or computers.

A memory server can also reduce cache misses and page faults and thus increase performance. A memory server according to the present invention can be specially designed for memory service and may choose from a plurality of different replacement and searching algorithms for use with different applications to achieve the best performance.

Performance improvement is possible due to faster accesses to the data, since a memory server according to the present invention can provide a better prediction of future accesses based on access patterns and push the needed data through the memory hierarchy ahead of time. As a dedicated memory server executes its data access prediction algorithms, aggressive prediction methods can be used with more history information of data accesses because computational processor time is not being sacrificed for memory management. That is, the computing elements are relieved of the burden of pre-fetching and can concentrate on computing while cache operations can become more sophisticated.

Reduced energy consumption can be had at the client side due to the reduced memory and disk requirements. Further energy savings may be had by utilizing one memory server to support the memory needs of multiple clients Also, a memory server according to the present invention may be the only way to enable smaller mobile devices to run large applications when the small mobile devices contain little memory and small, or no, cache to save battery power.

Further, networking advances make the memory service design of the present invention feasible in a network environment. Network speed is increasing rapidly. The increased use of fiber optics has fueled the rapid growth of network speeds in the last decade. Theoretically, fiber optic bandwidth is unlimited because the attenuation of signal over the short distances is flat. Many system interconnects can now operate at 1 to 10 Gbps. The current fastest network launched to connect TeraGrid sites is operating at 40 Gbps. Plans were announced in 2004 to develop 100 Gbps network interconnects.

The speed growth of wireless networks is occurring at the same pace as wired networks. Current Wireless LAN specification of 802.11 is at 54 Mbps, which was just 2 Mbps with 802.11a few years ago. Current 2.5 or 3G cell phones operating at 144 Kbps or more are offering a wide variety of applications. The speed of these cell phone networks may grow rapidly to Gigabit speeds with the current demand.

Network speed growth enables use of network hardware and network data provision services with low latency (~1 ns for a byte of data transfer with a 10 Gbps network). Thus, remote memory services can be realistically provided. The current memory access time for the fastest processors is now at 60 to 100 ns. For a typical cache block size of 32 bytes; a network transfer of 32 bytes would cost less than 32 ns of processor time with a 10 Gbps network (without considering the startup cost and assuming that there is a special link between the cache and network card). With future 100 Gbps interconnects, this cost further can be reduced multiple times. In mobile processors with smaller cache and memory the memory access time cost is even more. Thus, the present invention can benefit networked computing by providing network-based memory services to push necessary data nearer to the client CPU faster than traditional memory.

A memory service hardware and architecture according to the present invention may have three or more components including the main memory server components of a prefetch engine, a memory management engine, and a data propeller. It will be understood that the memory server will include its own processor for the performance of the functional modules or processes described herein. In some embodiments a memory service provider process running on the memory server and waiting for service requests from client nodes will initiate server operations. Based on the request type from the client, this process can initiate data transfers between the client and the server. A miss handler daemon process can take the on-demand misses from a client node's local DRAM, its cache, or its prefetch cache. The missed reference and access pattern information may be stored in a data access pattern table to help predict the future data accesses required by the client.

The prefetch engine can run a future access predictor daemon process to predict future accesses required by the client based on the information of data access patterns. This future access predictor daemon can dynamically choose the most effective reference prediction algorithm and pass the predicted data references to a request generator, which in turn sends its request to the data propeller module to push the required data to the client prefetch cache or other memory, depending on the model of the memory service is used. The data propeller module handles the data transfers between the client and the memory server and responds to any cache miss at the client. The miss handler sends information to both the memory management engine and the data propeller. In some embodiments it will be understood that the data propeller is only for data prefetching. The immediate data fetching will be handled by the memory management engine. The miss information will thus be sent to the memory management engine for fetching and to the data propeller for future prefetching.

The data propeller thus pushes data from the server memory to the client DRAM or cache before the client needs it. If a properly designed link exists between the server's cache and the client cache a cache designed for the purpose of memory service can be utilized within the server so that the data propeller can push data from the memory server's cache to the client's cache directly.

The data propeller module obtains the cache miss information and data reference information from the miss handler daemon, and also pushes the data of predicted accesses. In addition, the data propeller or the memory management engine can use the data access pattern information to prefetch or fetch, respectively, data from the disk of the memory server into its server memory to speedup the memory service.

Discussion of the modules or applications will be given herein with respect to specific functional tasks or task groupings that are in some cases arbitrarily assigned to the specific modules or applications for explanatory purposes. It will be appreciated by the person having ordinary skill in the art that aspects of the present invention may be arranged in a variety of ways, utilize hardware, software, or firmware, and that functional tasks may be grouped according to other nomenclature or architecture than is used herein without doing violence to the spirit of the present invention.

BRIEF DESCRIPTION OF THE DRAWING

These and other objects and features of this invention will be better understood from the following detailed description taken in conjunction with the drawing wherein:

The FIG. shows a block diagram of different kinds of clients connected to a detailed block diagram of the memory server.

DETAILED DESCRIPTION OF PREFERRED EMBODIMENTS

While traditionally, memory is an integrated part of a computing device, the present invention provides memory support as a service. A memory server according to the present invention may be tightly connected to the processing element(s) or connected via communication networks. The service could be static or dynamic, and could be the sole memory or could be an addition to the traditional integrated memory system of a client. The memory server can handle cache misses as well as avoid cache misses and page faults. The memory server is enabled to apply aggressive prefetch prediction algorithms and dynamic replacement policies to reduce the cache misses and hide memory access latency without cost to the computational processor. Client computers can access the memory server for advanced and deep memory hierarchy needs. This is a cost effective solution since the memory service avoids having to install deeper and advanced memory hierarchy at each client.

In traditional memory hierarchy the memory populates cache memories with lines of data if a cache miss occurs. The disk storage provides the data to the main memory as pages when a page fault occurs. Average memory access time cost depends both on memory hierarchy parameters (such as capacity, line size, page size, memory and cache bandwidth, and associativity) and the data access patterns of the application. This average memory access cost can severely affect the application performance when the size of the working set of all pages is more than the capacity of the traditional system's memory or the data accesses are non-contiguous. Memory performance of known systems might be improved by increasing the memory capacity and by applying aggressive data prefetching and replacement policies. However, in known systems the memory hierarchy architecture is fixed and it is not possible to adapt to an application's requirements. Merely increasing the size of each level of memory hierarchy may not be cost effective. Also, if aggressive prefetching algorithms are used in known systems, the CPU's available computing time is reduced, thereby reducing the application performance. To solve these burdens on the processor and memory architecture of known systems, the present invention can provide a memory server for memory service. The memory service can be based on the application requirements as learned by predictor daemons.

Referring to the FIG., an exemplary memory service 11 supplies clients 13 by pushing data into higher memory levels of the client, such as a client prefetch cache 15, thereby eliminating reliance on slower client memory and data storage processes and apparatus. Client 0 illustrates a regular computer with a specially designed prefetch cache 15. Client 1 does not have memory and can only support a pure server model, as further discussed below. Client 2 has memory but decides to use pure server model. Client 3 adopts a hybrid server model.

Generally described, the main components of a memory server 11 that are common to all the designs are: a prefetch engine 12, a memory management engine 14, and a data propeller 16. A microprocessor (not shown) which is separate from the client processor will be understood to perform and control the functions of the memory server 11. The functions of a prefetch engine 12 are to observe the data access pattern of the application, and to predict the future data references. The prefetch engine 12 contains a future access predictor 33 and a request generator 22. The future access predictor 33 can use adaptive sequential prefetching, Markov chain, or any existing or future strategies to predict the future references. The request generator 22 adaptively chooses the order of prefetch requests and the prefetch distance and sends these requests to the data propeller 16. The request generator 22 desirably decides the prefetch distance in such a way that data is pushed to the destination "just in time," so that there is no pollution at the destination or the data does not arrive at the destination too late. Based on the type of data references, there may be two types of prefetch engines; a cache prefetch engine and a memory prefetch engine. A cache prefetch engine would monitor the patterns of past cache line references and predict the future cache line references. A memory prefetch engine would predict the memory page references by monitoring the page access pattern of the application.

The data propeller 16 contains the information of the location of the data, e.g., memory of the server, remote memory, or local memory, and sends the prefetch signal to the appropriate location. The memory management engine 14 selects the effective way of transferring the data from the data location to the destination. The memory management engine 14 is also responsible to fetch the data to the client's local memory when there is a cache miss or page fault, i.e., initial misses, based on the function of the memory server. These initial misses occur before the prefetch engine 12 starts monitoring the data access pattern of the application. The memory management engine 14 may also contain a search/replacement policy adopter module 49 which can adaptively choose the most effective replacement policy, from among a pool of replacement policies, which is appropriate for the current data access pattern of the client's application. This increases the adaptivity of the memory server 11 to tune the workload of each application.

In the present invention a memory server 11 can push data into the client computing engine's cache or memory. The memory server 11 prefetches data and pushes it into the client's memory hierarchy, e.g. 15, 17, 19, whenever appropriate and possible. If cache misses or page faults occur at the client 13, the memory server 11 sends the requested but missed data to the client's cache 15, 17, or the client memory 19, accordingly. A client prefetch cache 15 can be specially designed for the present invention to support dynamic, push-based prefetching. Some advanced computer systems in fact may already have built-in prefetch caches for their local DRAM.

In one embodiment of the present invention, the memory service 11 may comprise any or all of various hardware, software, or firmware components, such as understood in the art and which will be left to the choice of the designer, to provide a memory service provider 23 process which runs on the memory server 11 and waits for service requests from clients. Based on the request type, a pure service request or a hybrid service request, as further explained below, or if data needs to be copied from the client's memory 15, 17, 19 to the memory server 11, the memory service provider 23 initiates data transfers between the client 13 and the server 11.

A miss handler daemon 25 process is responsible to take the client's 13 on-demand cache misses from a client's local DRAM 17 as well as client prefetch cache 15. It will be appreciated that the lines or arrows of the FIG. will represent any operable signal or data transfer means. Missed data reference and data access pattern information for the client operations can be stored in a data access pattern table 31. The data access pattern table 31 thus stores the historical data accesses to help to predict future data references of the client operation.

The future access predictor daemon 33 process predicts the future data accesses based on the information of the data access pattern table 31. This future access predictor daemon 33 dynamically chooses the most effective reference prediction algorithm and passes the predicted references to the data propeller module 16. Many prefetching algorithms exist in the art, including algorithms based on sequential processing, adaptive sequential processing, stride, Markov, push, etc., as known in the art. However, most of the aggressive prefetching algorithms have been considered too costly and non-practical for use by the main application processor before the present invention.

The data propeller module 16 can then push the predicted reference data to e.g., the prefetch cache 15 of Client 0. The data propeller module 16 thus handles the data transfers between the prefetch cache 15 and the memory server 11 and responds to any cache miss from the client 13. The client 13 can have a specially designed prefetch cache or use existing cache such as the L2 cache 17 as the prefetch cache, or in some cases may use the local DRAM 19 as in Client 3. The data propeller module 37 obtains the cache miss information and information of data references from the miss handler daemon 25. The data propeller module 16 also pushes the data of predicted future accesses, such as may be retrieved from its local server DRAM memory 45 or memory storage disk 47, to the client prefetch cache 15. The push and prefetching may be multiple steps, including push data from the server disk 47 to the server memory 45, and from the server memory, or from the server cache 44 if the server cache 44 has a direct connection to the client, to client cache 15, 17 or client memory 19. The server cache 44 may be a specially designed or adapted cache memory.

Some embodiments of the memory server 11 may include the search/replacement policy adopter daemon 49 which selects replacement policies in its memory management engine 14, based on the client application's data access pattern, for the server's local DRAM 45 to utilize the fetched data to its full extent before the data is replaced. This policy information can also be taken into consideration by the future access predictor daemon 33.

In operation, the client device 13 can initialize the execution of a memory server thread by sending a request to the memory service provider 23 agent to handle its memory requirement. This request includes initial data reference information. The memory server 11 starts a thread with the components of the architecture as discussed above. The data propeller module 16 sends a few lines of data from the requested address space to the client prefetch cache 15 and the client processor 53 resumes its application execution. The data propeller module 16 desirably sends more than one line of data initially, assuming that spatial locality exists among the data accesses. The miss handler daemon 25 collects the cache misses, i.e., missed data references from the prefetch cache 15 and local memory 19. This client access information can be stored in the data access pattern table 31. Alternatively, a pattern table need not be used if prediction is supported by pattern recognition without the need for holding the data.

Based on the client access information, e.g., such as stored in the data access pattern table 31, the future access predictor daemon 33 predicts the next data reference and the data propeller module 16 pushes the corresponding data into the prefetch cache 15. A prefetch cache miss occurs when there is a false prediction. To reduce prefetch cache misses, the data propeller module 16 sends more than one predicted line of data in the starting stages and the future access predictor 33 daemon dynamically fine-tunes its predictions based on an increasing amount of access pattern information. To handle a prefetch cache miss, the miss handler daemon 25 alerts the memory management engine 14 when a cache miss occurs and the memory management engine 14 fetches and sends the needed/missed data immediately without waiting for the future access predictor daemon 33.

The client device 13 has the option to completely depend on the memory server 11 to handle its data requests or to use the memory server 11 as an extended service. To provide this flexibility to the client 13, the memory server 11 may offer two models of operation, a pure server model and a hybrid server model.

With the pure server model, while the client 13 may have caches, all the data resides at the memory server 11. The client 13 sends a request to the memory server 11 and the memory server 11 deals with populating the client prefetch cache 15 and handles any cache misses. This provides better performance because of aggressive prefetching for long runs. The pure server model may be appropriate to multicore chips or shared memory systems where the memory server 11 is physically close to the client 13. The pure server model may also save energy for the client 13. When a client 13 starts, the client 13 can move its memory 19 and disk 21 into low power modes and let the memory server 11 serve as the client's memory and disk for a given application. In other cases, some clients may not be required to have main memory or a disk and can be designed to work with a memory server.

In pervasive computing environments, hand-held devices have small memories. These client devices may choose the memory server 11 to handle their memory requirements. The memory service can be offered as a web service in which the client transparently discovers and connects to the nearest memory service. It is noted that the local memory and disk do not necessarily need to be deleted from the client computer, but can just be turned off, partially or fully, to save energy.

With the hybrid server model, the client 13 can use its memory 19 and disk 21, such as especially for all data access patterns with good locality among the data accesses. The client 13 switches to the memory server 11 when data locality is poor among the accesses or under other conditions, such as where a large amount of memory is required to cover the working set of an application. The client 13 can use a prediction model such as set forth in S. Byna et al., *Predicting Memory-Access Cost Based on Data-Access Patterns*, Proceedings of IEEE International Conference on Cluster Computing, San Diego, September 2004; which is hereby incorporated by reference in its entirety, to make a decision on whether to choose a memory service, or which mode of the memory service to choose, or both.

In a pure server model, the memory server will be notified that its service is requested from the client. When a pure server model is requested the memory server processor assumes the memory management duties for the client. The memory server monitors the client cache's data access pattern directly and predicts the client application future accesses in order to retrieve the data and push it closer to the client, e.g., to the prefetch cache of the client. In the hybrid server model, when the client 13 decides to utilize a memory service, the client sends a request to the memory service provider 23. The memory service provider 23 will initiate a daemon to transfer the client's current address reference tables and to transfer the number of instructions to execute with memory service as included in the initial request of the client 13. The memory server 11 collects the virtual address mapping from the translation look-aside buffer and the page table memory of the client 13. Then the memory server 11 transfers this required data (related to the address map of the client) from the client disk 21 to the memory server local memory 45. To maintain data consistency, the memory server 11 can save the data back to the client disk 21 when the client's request is finished. The data copying between the client 13 and the memory server 11 can be overlapped with application execution at the client processor 53. The decision making process at the client 13 to utilize the memory services from the memory server 11 may consider the burden of transferring the data between the client 13 and memory server 11, i.e., in the hybrid server model the client 13 invokes the services of the memory server 11 only when needed for improved performance, or the conservation of energy, or under other appropriate conditions.

While certain exemplary embodiments have been put forth to illustrate the present invention, these embodiments are not to be taken as limiting to the spirit or scope of the present invention which is defined by the appended claims.

I claim:

1. A system of memory service for computing, comprising:
   a client device including a first processor or processing core that is capable of processing an application, and a memory system; and
   the client device including a built-in memory server connected to the memory system of the client device, the memory server including:
   a prefetch engine for observing a data access pattern of the application processed by the client device and predicting future data requests of the client device;
   a memory management engine for fetching predicted data, and including a data propeller for transferring predicted data higher in a memory hierarchy of the client and closer to the first processor or processing core; and
   a second processor or processing core for processing the prefetch engine and the memory management engine.

2. The system of memory service for computing of claim 1, wherein at least some data storage requirements of the client device are obtainable from the memory server during execution of the application.

3. The system of memory service for computing of claim 1, further comprising the prefetch engine having a predictor process for monitoring the data access patterns of the client device and predicting future data requests of the client device, wherein the prefetch engine passes the predicted data requests to the data propeller, and the data propeller module passes a predicted data to a cache or memory device of the client device.

4. The system of memory service for computing of claim 2, further comprising a search/replacement policy adopter process for dynamically adopting memory management polices for the utilization of data by memory of the client device.

5. A memory server for improving an operation of a client memory system of a client device, comprising:
   a memory server processor or processing core dedicated to the memory server;
   the memory server built in with the client device and connected to a client memory system for managing data needs for the client memory system or a client application processor;
   a prefetch engine for observing a data access pattern of an application processed by the client device and predicting future data requests of the client device;
   a memory management engine for fetching predicted data, and including a data propeller for transferring predicted data higher in a memory hierarchy of the client and closer to the first processor or processing core; and
   the memory server operably connectable to the client memory system for the client application processor or client memory system to receive data from the memory server, whereby the client application processor can be relieved of a data management burden by the memory processor to increase an application processing speed of the client application processor.

6. The memory server of claim 5 wherein the data management needs include data prediction, pre-fetch, storage, and retrieval needs.

7. The memory server of claim 5 further comprising a data access prediction algorithm.

8. The memory server of claim 5 wherein the memory server can choose from a plurality of prediction algorithms.

9. The memory server of claim 5 further comprising a means for monitoring data access patterns of the application processor.

10. The memory server of claim 5 further comprising a means for identifies data access patterns of the application processor.

11. The memory server of claim 5 wherein the memory server has a pure server model and a hybrid server model.

12. The memory server of claim 5 further comprising the memory server operably connected to a client application processor.

13. The memory server of claim 5 further comprising the memory server operably connected to a high level client memory storage location for the client application processor.

14. The memory server of claim 5 wherein the client memory system includes a prefetch cache, an L1 cache, an L2 cache or client DRAM.

15. A memory server device for installation within a client device, comprising:
   a) means for communicating with the client device when installed within the client device;
   b) a memory server architecture, including:
      i) a memory service provider process running on the memory server and initiating data transfers to higher in a memory hierarchy of the client device;
      ii) a miss handler daemon process for taking on-demand misses from the client's local memory; and transferring data access requests from the client to a data access pattern table;
      iii) a data access pattern table for tracking and storing historical data access request patterns from the client device; to help predict future data requests of the client device;
      iv) a future access predictor daemon process for predicting the future data requests of the client based on the information from the data access pattern table and for passing a predicted reference to a data propeller module;
      v) a data propeller module for handling the data transfers and pushing missed data from the miss handler daemon and predicted data from future access predictor daemon process higher in the memory hierarchy of the client device; and
   c) whereby:
      i) the client device requests an initial data reference;
      ii) the data propeller module obtains the requested data reference and sends a plurality of lines of data from the requested address space to a client device cache;
      iii) the miss handler daemon collects any missed data references from the cache and local memory and stores the missed data references access information in the data access pattern table; the miss handler daemon alerts the data propeller module when a cache miss occurs and the data propeller sends the missed data immediately without waiting for the future access predictor daemon; and
      iv) the future access predictor daemon predicts the next data reference based on previous client data accesses and the data propeller retrieves and pushes the predicted data into the cache of the client device, while tracking cache misses, and dynamically fine-tunes its predictions of future data based on an increasing amount of access pattern information for the client application.

16. The memory server device of claim 15 further comprising a search/replacement policy adopter daemon for selecting polices for the utilization by the client device of fetched data to a full extent before it is replaced, and sharing of client application data access patterns with the future access predictor daemon.

17. The memory server device of claim 15 further comprising a pure server model whereby all the data for the client application is supplied by the memory server.

18. The memory server device of claim 15 further comprising a hybrid server model whereby the client uses its memory and disk for all data access patterns with a predetermined standard of locality among its required data accesses and uses the memory server when the data locality is less than the predetermined standard of locality among required data accesses.

19. The system of memory service for computing of claim 1 wherein the client device comprises a multi-core processor, a first core of the multi-core processor is dedicated to the processing an application, and a second core of the multi-core processor is dedicated to the memory server.

20. The memory server of claim 15 wherein the memory server comprises a processing core that is a dedicated processing core of a multi-core processor of a client device, and a second core of the multi-core processor is dedicated to the application processing of the client device.

* * * * *